US010293789B2

(12) United States Patent
Nagae

(10) Patent No.: US 10,293,789 B2
(45) Date of Patent: May 21, 2019

(54) CONTROL DEVICE FOR VEHICLE HEATER

(71) Applicant: Toyota Jidosha Kabushiki Kaisha, Toyota-shi, Aichi-ken (JP)

(72) Inventor: Hajime Nagae, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 199 days.

(21) Appl. No.: 15/622,874

(22) Filed: Jun. 14, 2017

(65) Prior Publication Data
US 2017/0361809 A1 Dec. 21, 2017

(30) Foreign Application Priority Data

Jun. 17, 2016 (JP) .................................. 2016-120361

(51) Int. Cl.
B60S 1/02 (2006.01)
H04N 7/18 (2006.01)
H05B 1/02 (2006.01)
B60J 1/00 (2006.01)
H05B 3/84 (2006.01)
B60S 1/56 (2006.01)

(52) U.S. Cl.
CPC ............... B60S 1/026 (2013.01); B60J 1/002 (2013.01); B60S 1/56 (2013.01); H04N 7/183 (2013.01); H05B 1/0236 (2013.01); H05B 3/84 (2013.01); H05B 2203/008 (2013.01)

(58) Field of Classification Search
CPC .. B60S 1/026; B60S 1/56; B60J 1/002; H04N 7/183; H05B 1/0236; H05B 3/84; H05B 2203/008

USPC .......................................................... 701/36
See application file for complete search history.

(56) References Cited

U.S. PATENT DOCUMENTS 9,288,270 B1* 3/2016 Penilla .................. H04W 4/046
2010/0070456 A1* 3/2010 Sugihara .................. G06N 5/02
706/54
2010/0219173 A1 9/2010 Gruber
(Continued)

FOREIGN PATENT DOCUMENTS

EP 2644005 B1 9/2014
JP 62-203855 A 9/1987
(Continued)

Primary Examiner — Tuan C To
(74) Attorney, Agent, or Firm — Dinsmore & Shohl LLP

(57) ABSTRACT

A control device for a vehicle heater includes: a camera; a heater configured to heat a portion of the window glass located in front of the camera; a temperature sensor configured to acquire a camera temperature; an illuminance acquisition unit configured to acquire an illuminance outside the vehicle; and a control unit configured to determine that a control prohibition condition to prohibit execution of the heater energization control is satisfied when the camera temperature is equal to or larger than a prohibition threshold temperature, execute the heater energization control when execution of the heater energization control is requested, prevent execution of the heater energization control when the control prohibition condition is satisfied, and when the illuminance is lower than a threshold illuminance, set the prohibition threshold temperature to be lower than when the illuminance is equal to or larger than the threshold illuminance.

10 Claims, 9 Drawing Sheets

(56) References Cited

U.S. PATENT DOCUMENTS

| | | | |
|---|---|---|---|
| 2013/0314540 A1 | 11/2013 | Hacker et al. | |
| 2014/0265555 A1* | 9/2014 | Hall | H01F 38/14 |
| | | | 307/9.1 |
| 2016/0052366 A1* | 2/2016 | Hoke | B60H 1/00785 |
| | | | 219/203 |
| 2016/0232625 A1* | 8/2016 | Akutagawa | G06F 16/90324 |
| 2016/0280224 A1* | 9/2016 | Tatourian | B60W 30/143 |
| 2016/0360384 A1* | 12/2016 | Park | H04W 4/12 |
| 2017/0028811 A1* | 2/2017 | Jayasundera | B60H 1/00742 |
| 2017/0106721 A1* | 4/2017 | Hoke | B60H 1/00785 |
| 2017/0126834 A1* | 5/2017 | Fransen | H04L 67/303 |
| 2017/0142023 A1* | 5/2017 | Yadav | H04L 47/70 |
| 2017/0372444 A1* | 12/2017 | Hosokawa | G06T 1/00 |

FOREIGN PATENT DOCUMENTS

| | | | | |
|---|---|---|---|---|
| JP | 09311029 A | * | 12/1997 | E21D 11/00 |
| JP | 2004-096328 A | | 3/2004 | |
| JP | 2008239017 A | * | 10/2008 | |
| JP | 2010-168042 A | | 8/2010 | |
| JP | 2010-534588 A | | 11/2010 | |
| JP | 2014040233 A | * | 3/2014 | H04N 5/2252 |
| JP | 2016-037111 A | | 3/2016 | |

\* cited by examiner

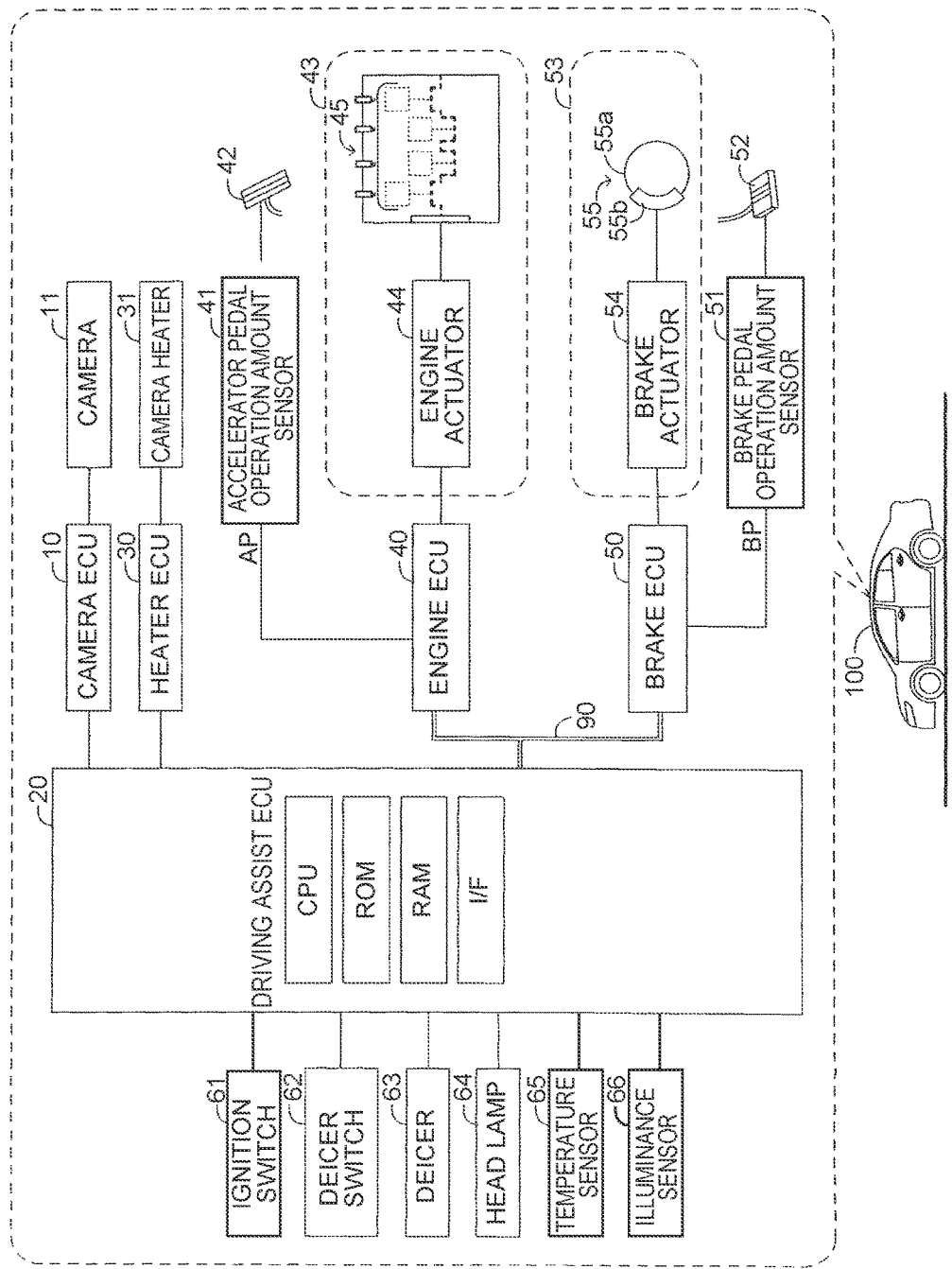

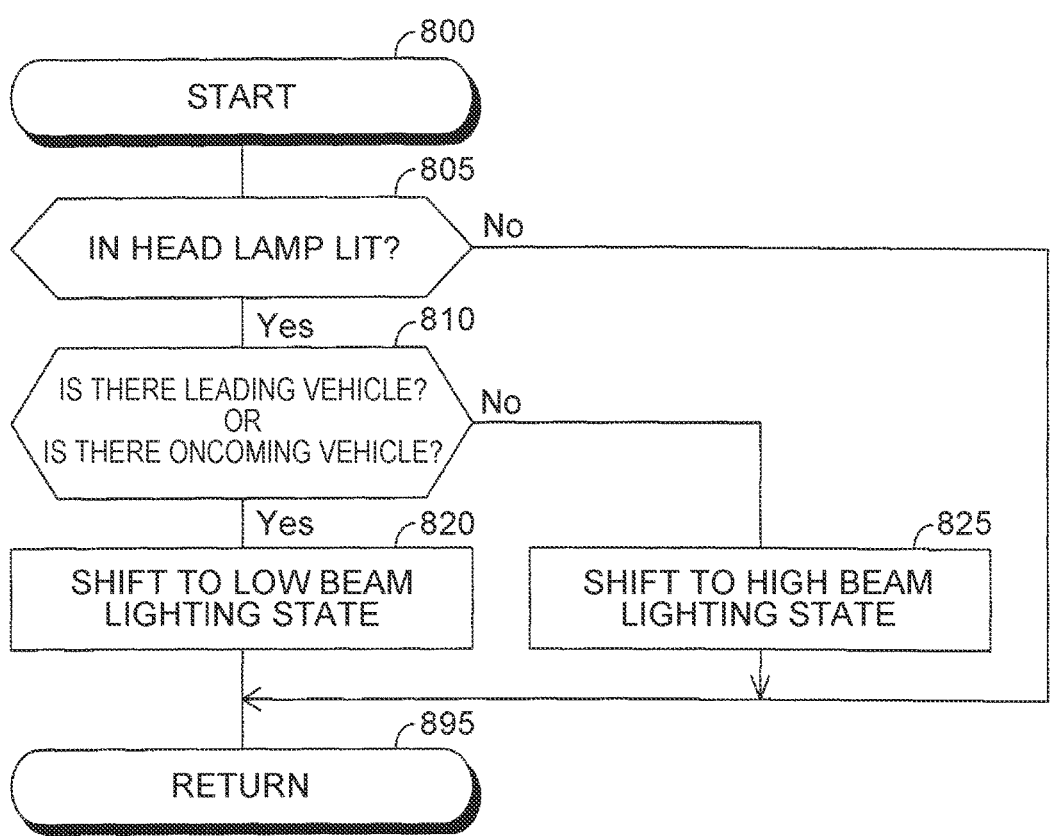

CONTROL DEVICE FOR VEHICLE HEATER

CROSS-REFERENCE TO RELATED APPLICATIONS

This application claims priority to Japanese Patent Application No. 2016-120361 filed on Jun. 17, 2016 which is incorporated herein by reference in its entirety including the specification, drawings and abstract.

BACKGROUND

1. Technical Field

The present disclosure relates to a control device for a vehicle heater.

2. Description of Related Art

There is known a system for performing driving assist control (which is referred to as "a driving assist system" below) that assists a driver driving a vehicle. The driving assist system includes a camera photographing a forward view of the vehicle through a window glass (for example, a windshield glass or a rear glass). The driving assist system performs driving assist control using an image (which is referred to as "a camera image" below) photographed with the camera. The conventional assist system further includes a heater device to prevent or remove fogging on a portion of the window glass located in front of the camera (see, for example, EP Patent Application Publication No. 2644005).

When the heater device of the driving assist system heats the portion of the window glass located in front of the camera, the heater device also heats the camera so that the temperature of the camera (which is referred to as "camera temperature" below) also rises. When the camera temperature becomes excessively high, noises (which are referred to as "heat noises" below) may be generated in the camera image.

In the case of determining whether or not a leading vehicle is present in a camera image taken in the nighttime, the driving assist system determines whether or not the leading vehicle is present in the camera image based on red points indicative of tail lamps of the leading vehicle in the camera image. In the case of determining whether or not an oncoming vehicle is present in the camera image taken in the nighttime, the driving assist system further determines whether or not the oncoming vehicle is present in the camera image based on white points indicative of head lamps of the oncoming vehicle on the camera image.

SUMMARY

However, when heat noises are generated in the camera image taken in the nighttime as described before, it is difficult for the driving assist system to distinguish the heat noises from the red points indicative of the tail lamps of the leading vehicle and the white points indicative of the head lamps of the oncoming vehicle. In this case, the driving assist system has difficulty in determining whether or not the leading vehicle and the oncoming vehicle are present in the camera image.

The present disclosure provides a control device for a vehicle heater (which may also be referred to as "the device according to the present disclosure") having a high possibility of being able to prevent heat noises from being generated in the camera image photographed in the nighttime.

A first aspect of the disclosure provides a control device for a vehicle heater. The control device for a vehicle heater according to the first aspect includes: a camera configured to photograph an outside of a vehicle from an inside of the vehicle through a window glass of the vehicle; a heater configured to generate heat upon energization and to heat a portion of the window glass located in front of the camera using the heat; a temperature sensor configured to acquire a camera temperature correlation value that is a value correlated with temperature of the camera; an illuminance acquisition unit configured to acquire an illuminance correlation value that is a value correlated with illuminance outside the vehicle; and a control unit configured to execute heater energization control that controls energization of the heater, determine that a control prohibition condition to prohibit execution of the heater energization control is satisfied when the camera temperature correlation value is equal to or larger than a prohibition threshold temperature correlation value, determine that a control permission condition to permit execution of the heater energization control is satisfied when the camera temperature correlation value is smaller than a permission threshold temperature correlation value that is equal to or smaller than the prohibition threshold temperature correlation value, execute the heater energization control when execution of the heater energization control is requested and the control permission condition is satisfied, prevent execution of the heater energization control when the control prohibition condition is satisfied, and when the illuminance correlation value is smaller than a threshold illuminance correlation value, set the prohibition threshold temperature correlation value to be smaller than when the illuminance correlation value is equal to or larger than the threshold illuminance correlation value.

According to the first aspect, a value set as the prohibition threshold temperature correlation value in the nighttime when the illuminance correlation value is smaller than the threshold illuminance correlation value is smaller than a value set as the prohibition threshold temperature correlation value in the daytime when the illuminance correlation value is equal to or more than the threshold illuminance correlation value. Therefore, the camera temperature in the nighttime is maintained to be lower than the camera temperature in the daytime. Accordingly, there is a high possibility that generation of heat noises in the camera image photographed in the nighttime can be prevented.

In the first aspect, the control unit may be configured to set the permission threshold temperature correlation value to be smaller than the prohibition threshold temperature correlation value.

According to the above aspect, a hysteresis is provided between prohibition of execution of the heater energization control and permission of execution of the heater energization control. Therefore, it becomes possible to prevent the heater energization control from being permitted and started immediately after the heater energization control is prohibited and the heater energization control is stopped. Accordingly, it becomes possible to prevent repeated execution of stop and start of the heater energization control in a short period of time.

A second aspect of the disclosure provides a control device for a vehicle heater. The control device for a vehicle heater according to the second aspect includes: a camera configured to photograph an outside of a vehicle from an inside of the vehicle through a window glass of the vehicle;

a heater configured to heat a portion of the window glass located in front of the camera upon energization; a temperature sensor configured to acquire temperature of the camera; an illuminance acquisition unit configured to acquire information about illuminance outside the vehicle; and a control unit configured to execute heater energization control that controls energization of the heater, the control unit being configured to control energization of the heater when the temperature is equal to or higher than a temperature threshold, and when the illuminance is lower than an illuminance threshold, set the temperature threshold to be smaller than when the illuminance is equal to or higher than the illuminance threshold.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 illustrates a vehicle to which a control device for a vehicle heater according to the present embodiment is applied and the configuration of the vehicle;

FIG. 8 is a flowchart illustrating a routine executed by the CPU of the driving assist ECU illustrated in FIG. 1

DETAILED DESCRIPTION OF EMBODIMENTS

Hereinafter, a window glass heating device according to an embodiment of the present disclosure (which is referred to as "the device of the embodiment") will be described. The device of the embodiment is applied to a vehicle 100 illustrated in FIG. 1. The device of the embodiment includes a camera ECU 10, a driving assist ECU 20, a heater ECU 30, an engine ECU 40, and a brake ECU 50.

Figure 2A:
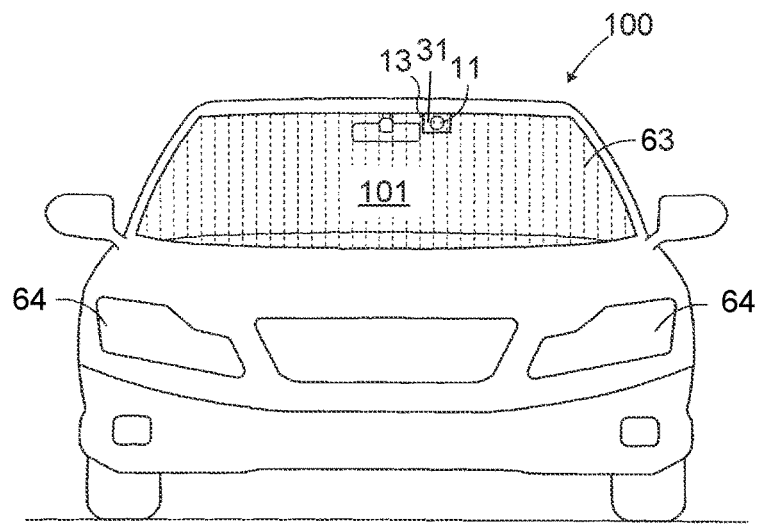
FIG. 2A is a front view of the vehicle illustrated in FIG. 1.
Figure 2B:
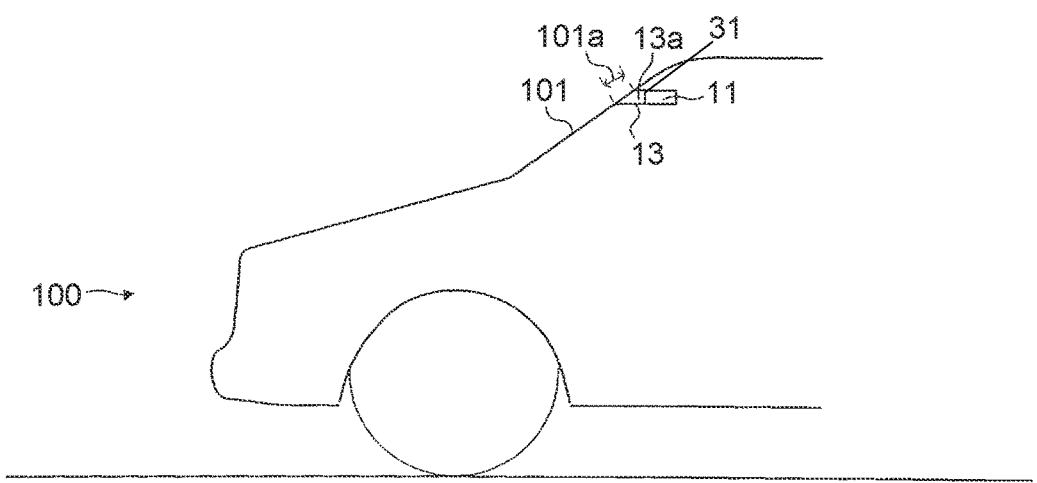
FIG. 2B is a fragmentary side view of the vehicle illustrated in FIG. 1.

The vehicle 100 includes a camera 11. The camera 11 is a well-known charge-coupled device (CCD) camera or complementary Metal Oxide Semiconductor (CMOS) camera. The camera 11 is disposed inside the vehicle 100, i.e., inside a windshield glass 101 that is one of the front window glasses of the vehicle 100 as illustrated in FIG. 2B. The camera 11 is supported to the vehicle 100 with a bracket (supporting member) 13. The bracket 13 is made of a resin material.

The camera 11 photographs the outside of the vehicle 100 from the inside of the vehicle 100 through the windshield glass 101. As illustrated in FIG. 1, the camera 11 is connected to the camera ECU 10. The camera ECU 10 is connected to the driving assist ECU 20. The camera ECU 10 creates image data based on images photographed with the camera 11. The camera ECU 10 transmits the image data to the driving assist ECU 20.

The vehicle 100 includes a camera heater 31. As illustrated in FIGS. 2A and 2B, the camera heater (which is simply referred to as "heater" below) 31 is disposed on the bracket 13 so as to heat space 13a in front of the camera 11, the space being surrounded with the bracket 13. More specifically, the space 13a is a closed space surrounded with the camera 11, the bracket 13, and the windshield glass 101. Therefore, the heater 31 is disposed on a portion of the bracket 13 between the camera 11 and the windshield glass 101.

As illustrated in FIG. 1, the heater 31 is connected to the heater ECU 30, and the state of the heater 31 is set to an ON (electrically connected) state or an OFF (electrically disconnected, cutoff) state by the heater ECU 30.

When the heater 31 is energized, the space 13a is heated with the heat generated by the heater 31. As a result, a portion 101a of the windshield glass 101 in front of the camera 11 (which is referred to as "the specific windshield glass portion" below) is heated. As a consequence, when the specific windshield glass portion 101a is fogged with moisture, the heating removes the fogging. When the specific windshield glass portion 101a is not fogged, the heating prevents the moisture from fogging the specific windshield glass portion 101a.

The driving assist ECU 20, the engine ECU 40, and the brake ECU 50 are connected to each other through a communication and sensor system controller area network (CAN) 90 so that they can exchange data (communicate) with each other. A term ECU in the ECUs 20, 40, 50 stands for electric control unit. The electric control unit is an electronic control circuit having a microcomputer as a main component part, the microcomputer including a CPU, a ROM, a RAM, and an interface. The camera ECU 10 and the heater ECU 30 also have the similar configuration.

The CPU in each of the ECUs 10, 20, 30, 40, 50 implements later-described various functions by executing instructions (or programs or routines) stored in the memory (ROM). The ECUs 10, 20, 30, 40, 50 may be integrated into one ECU.

The vehicle 100 includes an accelerator pedal 42. The accelerator pedal 42 is connected to an accelerator pedal operation amount sensor 41. The accelerator pedal operation amount sensor 41 is connected to the engine ECU 40. The accelerator pedal operation amount sensor 41 detects an operation amount AP of the accelerator pedal 42, and outputs a signal indicative of the operation amount (which is referred to as "the accelerator pedal operation amount" below) AP. The engine ECU 40 acquires the accelerator pedal operation amount AP based on the signal output by the accelerator pedal operation amount sensor 41.

The vehicle 100 includes an internal combustion engine 43. The internal combustion engine 43 includes an engine actuator 44 and an engine body 45. The engine actuator 44 includes actuators such as a throttle actuator and a fuel injection valve actuator which are not illustrated. The engine body 45 is provided with a fuel injection valve which is not illustrated. The fuel injection valve is operated by the fuel injection valve actuator.

The engine ECU 40 is connected to the engine actuator 44. The engine ECU 40 drives actuators such as the engine actuator 44 to change the torque generated by the internal combustion engine 43 and thereby regulates the driving force of the vehicle 100.

The vehicle 100 includes a brake pedal 52. The brake pedal 52 is connected to a brake pedal operation amount sensor 51. The brake pedal operation amount sensor 51 is connected to the brake ECU 50. The brake pedal operation amount sensor 51 detects an operation amount BP of the brake pedal 52, and outputs a signal indicative of the operation amount (which is referred to as "the brake pedal operation amount" below) BP. The brake ECU 50 acquires the brake pedal operation amount BP based on the signal output by the brake pedal operation amount sensor 51.

The vehicle 100 includes a brake device 53. The brake device 53 includes a brake actuator 54 and a friction brake mechanism 55. The brake actuator 54 is a hydraulic control actuator. The friction brake mechanism 55 includes components such as a brake disc 55a fixed to each wheel, a brake caliper 55b fixed to a vehicle body, and a brake pad which is not illustrated.

The brake ECU 50 is connected to the brake actuator 54. The brake ECU 50 controls the driving amount of the brake actuator 54 to regulate friction braking force generated by the friction brake mechanism 55, and thereby regulates the braking force of the vehicle generated by the brake device 53.

The vehicle 100 includes an ignition switch 61, a deicer switch 62, a deicer 63, a head lamp 64, a temperature sensor 65, and an illuminance sensor 66.

When the ignition switch 61 is set to an ON position, the driving assist ECU 20 requests the engine ECU 40 to start the internal combustion engine 43. The engine ECU 40 starts the internal combustion engine 43, when the start of the internal combustion engine 43 is requested from the driving assist ECU 20.

Furthermore, when the ignition switch 61 is set to an ON position, the driving assist ECU 20 requests the heater ECU 30 to execute heater energization control that controls energization of the heater 31. The heater ECU 30 starts the heater energization control, if a later-described specified condition (heater energization control permission condition) is satisfied when execution of the heater energization control is requested from the driving assist ECU 20.

As illustrated in FIG. 2A, the deicer 63 is embedded in the windshield glass 101 over the entire surface of the windshield glass 101. As illustrated in FIG. 1, the deicer 63 is connected to the driving assist ECU 20, and the state of the deicer 63 is set to the ON (electrically connected) state or the OFF (electrically disconnected, cutoff) state by the driving assist ECU 20.

The deicer switch 62 is connected to the driving assist ECU 20. When the deicer switch 62 is turned on (pressed) by the driver of the vehicle 100, the driving assist ECU 20 energizes the deicer 63. The deicer switch 62 is in the ON state as long as being pressed by the driver, and when the driver cancels pressing operation, the deicer switch 62 is automatically returned to the OFF state.

When the deicer 63 is energized, the entire windshield glass 101 is heated with the heat generated by the deicer 63. As a consequence, when the windshield glass 101 is fogged with moisture, the heating removes the fogging. When the windshield glass 101 is not fogged, the heating prevents the moisture from fogging the windshield glass 101.

The vehicle 100 includes the head lamp 64. The head lamp 64 is connected to the driving assist ECU 20. The driving assist ECU 20 shifts the lighting state of the head lamp 64 from a low beam lighting state to a high beam lighting state if a later-described specified condition (high beam conditions) is satisfied while the head lamp 64 is in the low beam lighting state. The high beam lighting state is the state where the head lamp 64 illuminates a distant area from the vehicle 100. The low beam lighting state is the state where the head lamp 64 illuminates a front area of the vehicle 100.

In contrast, the driving assist ECU 20 shifts the lighting state of the head lamp 64 from the high beam lighting state to the low beam lighting state if a later-described specified condition (low beam conditions) is satisfied while the head lamp 64 is in the high beam lighting state.

The temperature sensor 65 is connected to the heater ECU 30. The temperature sensor 65 detects the temperature of the camera 11, and outputs a signal indicative of the temperature (which is referred to as "camera temperature" below) T. The heater ECU 30 acquires the camera temperature T based on the signal output by the temperature sensor 65.

The illuminance sensor 66 is connected to the heater ECU 30. The illuminance sensor 66 detects the illuminance outside the vehicle 100, and outputs a signal indicative of the illuminance SD. The heater ECU 30 acquires the illuminance SD based on the signal output from the illuminance sensor 66.

<Outline of Operation of Device of Embodiment>

A description is now given of the outline of the operation of the device of the embodiment. The driving assist ECU 20 in the device of the embodiment performs head lamp control that controls the lighting state of the head lamp 64 as the driving assist control for the driver of the vehicle 100 as described below.

More specifically, assume the case where while the head lamp 64 is lit, the driving assist ECU 20 determines that one of "a vehicle traveling ahead of the own vehicle 100 (which is referred to as "a leading vehicle" below)" and "a vehicle traveling in a direction opposite to the travel direction of the own vehicle 100 (which is referred to as "oncoming vehicle" below) is present in a camera image 11a. In this case, when the lighting state of the head lamp 64 is in the high beam lighting state, the driving assist ECU 20 shifts the lighting state of the head lamp 64 from the high beam lighting state to the low beam lighting state.

On the contrary, assume the case where while the head lamp 64 is lit, the driving assist ECU 20 determines that neither a leading vehicle nor an oncoming vehicle is present in the camera image 11a. In this case, when the lighting state of the head lamp 64 is in the low beam lighting state, the driving assist ECU 20 shifts the lighting state of the head lamp 64 from the low beam lighting state to the high beam lighting state.

According to the head lamp lighting control described in the foregoing, it becomes unnecessary for the driver himself or herself to shift the lighting state of the head lamp 64 in accordance with the presence of the leading vehicle and the oncoming vehicle.

A description is now given of the outline of the heater energization control by the device of the embodiment. As described in the foregoing, when the ignition switch 61 is set to the ON position, the driving assist ECU 20 requests the heater ECU 30 to execute the heater energization control.

Furthermore, the driving assist ECU 20 permits the heater ECU 30 to execute the heater energization control when a later-described specified condition (heater energization control permission condition) is satisfied. Contrary to this, when another later-described specified condition (heater energization control prohibiting condition) is satisfied, the driving assist ECU 20 prohibits the heater ECU 30 from executing the heater energization control.

The heater ECU 30 starts the heater energization control in the case where the driving assist ECU 20 permits execution of the heater energization control when execution of the heater energization control is requested.

Upon start of the heater energization control, the heater ECU 30 starts to energize the heater 31. Then, at the moment when a specified energization continuation time Ton elapses, the heater ECU 30 temporarily stops energization of the heater 31. The heater ECU 30 then resumes energization of the heater 31 at the moment when a specified energization stop time Toff elapses. During execution of the heater energization control, the heater ECU 30 repeatedly perform energization of the heater 31 over the specified energization continuation time Ton and stop of energization of the heater 31 over the specified energization stop time Toff in sequence.

Consequently, the space 13*a* is heated with the heat generated by the heater 31. As a result, the specific windshield glass portion 101*a* in front of the camera 11 is heated. Accordingly, when the specific windshield glass portion 101*a* is fogged with moisture, the heating removes the fogging. When the specific windshield glass portion 101*a* is not fogged, the heating prevents the moisture from fogging the specific windshield glass portion 101*a*.

On the contrary, when the driving assist ECU 20 prohibits execution of the heater energization control during execution of the heater energization control, the heater ECU 30 stops the heater energization control.

When the ignition switch 61 is set to the OFF position, the driving assist ECU 20 does not request the heater ECU 30 to execute the heater energization control. In this case, when the heater energization control is in operation, the heater ECU 30 stops the heater energization control. When the heater energization control is not in operation, the heater ECU 30 keeps the state where the heater energization control is stopped.

Figure 3:
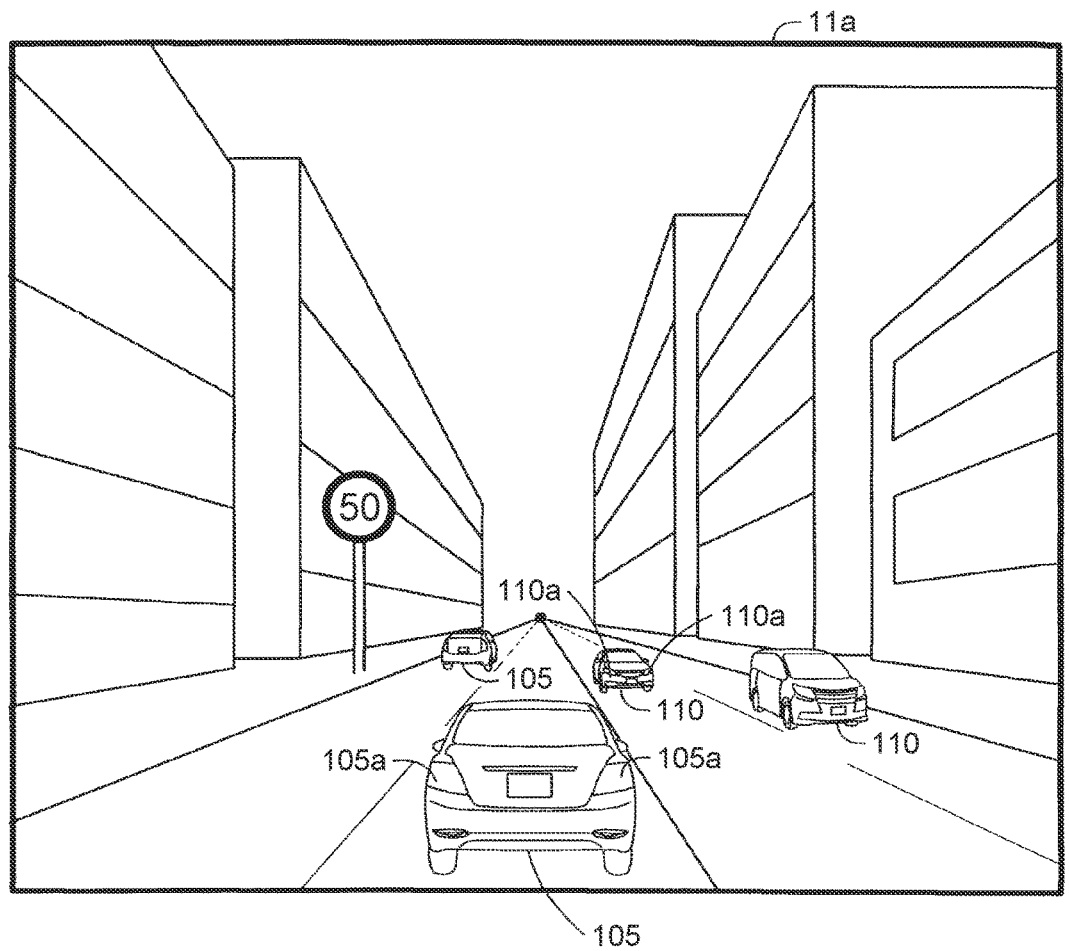
FIG. 3 illustrates one example of an image (camera image) photographed with a camera illustrated in FIG. 1.

As illustrated in FIG. 3, the camera 11 is used to photograph an image (which is referred to as "a camera image" below) 11*a* of a front view of the vehicle 100. When a leading vehicle 105 and an oncoming vehicle 110 are present for the own vehicle 100, the leading vehicle 105 and the oncoming vehicle 110 are shown in the camera image 11*a*.

The driving assist ECU 20 determines that the leading vehicle 105 is present when red points indicative of the tail lamp 105*a* of the leading vehicle 105 are shown in the camera image 11*a* photographed in the nighttime. The driving assist ECU 20 determines that the oncoming vehicle 110 is present when white points indicative of the head lamp 110*a* of the oncoming vehicle 110 are shown in the camera image 11*a* photographed in the nighttime.

As described in the foregoing, when the camera temperature T (temperature of a semiconductor incorporated in the camera 11 in particular) excessively rises, heat noises are generated in the camera image 11*a*. The number of the heat noises increases as the camera temperature T becomes higher. It is difficult for the driving assist ECU 20 to distinguish the heat noises from the red points indicative of the tail lamp 105*a* in the camera image 11*a*, and it is also difficult for the driving assist ECU 20 to distinguish the heat noises from the white points indicative of the head lamp 110*a* in the camera image 11*a*.

In this case, the driving assist ECU 20 has difficulty in determining whether or not the leading vehicle 105 is present and whether or not the oncoming vehicle 110 is present.

Accordingly, the device of the embodiment determines permission and prohibition of execution of the heater energization control by the heater ECU 30 as described below so as to prevent generation of the heat noises in the camera image 11*a* photographed in the nighttime. As a result, the device of the embodiment can reliably determine whether or not the leading vehicle 105 is present and whether or not the oncoming vehicle 110 is present.

When the illuminance SD acquired based on the signal output from the illuminance sensor 66 is equal to or higher than a threshold illuminance SDth, the driving assist ECU 20 in the device of the embodiment determines that current time is the time in the daytime. Accordingly, the driving assist ECU 20 sets a threshold temperature (which is referred to as "control permission threshold temperature" below) Tkyo, which is used in order to determine whether or not to permit the heater energization control, to a first control permission threshold temperature Tkyo1. The driving assist ECU 20 also sets a threshold temperature (which is referred to as "control prohibition threshold temperature" below) Tkin, which is used in order to determine whether or not to prohibit the heater energization control, to a first control prohibition threshold temperature Tkin1.

The first control prohibition threshold temperature Tkin1 is set to a temperature higher than the first control permission threshold temperature Tkyo1 (Tkyo1<Tkin1). Furthermore, the first control prohibition threshold temperature Tkin1 is a temperature obtained by an experiment or the like as a temperature at which heat noises are not generate in the camera image 11*a*. The first control prohibition threshold temperature Tkin1 is prestored in the ROM of the driving assist ECU 20.

Figure 4A:
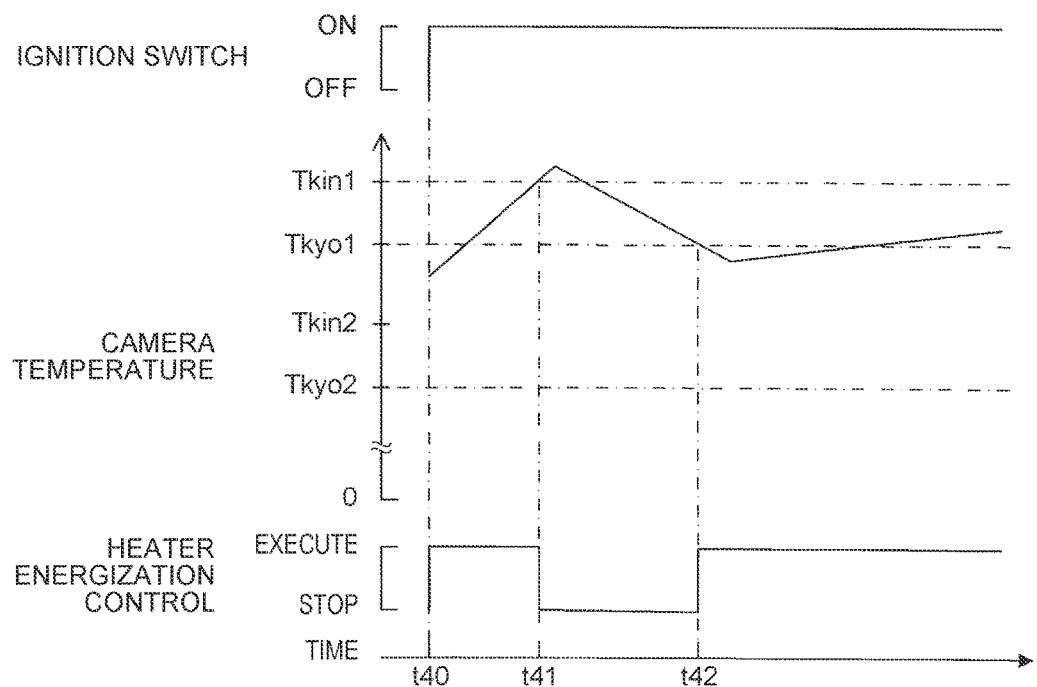
FIG. 4A is a time chart for describing one operating pattern of the control device for a vehicle heater according to the present embodiment.

In this case, as illustrated in FIG. 4A, when the ignition switch 61 is set to the ON position (time t40), the driving assist ECU 20 requests the heater ECU 30 to execute the heater energization control. At this time, when the camera temperature T is lower than the control permission threshold temperature Tkyo (=first control permission threshold temperature Tkyo1), the driving assist ECU 20 determines that the heater energization control permission condition is satisfied, and permits the heater ECU 30 to execute the heater energization control. As a result, since execution of the heater energization control is requested and the execution of the heater energization control is permitted, the heater ECU 30 starts the heater energization control.

On the contrary, assume the case, though not illustrated, where the camera temperature T is equal to or higher than the control permission threshold temperature Tkyo (=Tkyo1) at the moment when the ignition switch 61 is set to the ON position and the driving assist ECU 20 requests the heater ECU 30 to execute the heater energization control. In this case, the driving assist ECU 20 determines that the heater energization control permission condition is not satisfied, and does not permit the heater ECU 30 to execute the heater energization control. That is, although execution of the heater energization control is requested, the execution of the heater energization control is not permitted. Accordingly, the heater ECU 30 does not start the heater energization control, and maintains the state where the heater energization control is stopped.

Furthermore, as illustrated in FIG. 4A, when the heater energization control is started, and then the camera temperature T rises to the control prohibition threshold temperature Tkin (=first control prohibition threshold temperature Tkin1) or higher (time t41), the driving assist ECU 20 determines that the heater energization control prohibiting condition is satisfied, and prohibits the heater ECU 30 from executing the heater energization control. In this case, although execution of the heater energization control is requested, the execution of the heater energization control is prohibited, and therefore the heater ECU 30 stops the heater energization control.

In addition, when the heater energization control is stopped, and then the camera temperature T falls to the control permission threshold temperature Tkyo (=first control permission threshold temperature Tkyo1) or lower (time t42), the driving assist ECU 20 determines that the heater energization control permission condition is satisfied, and permits the heater ECU 30 to execute the heater energization control. As a result, since the heater energization control is requested and the execution of the heater energization control is permitted, the heater ECU 30 resumes the heater energization control.

When the illuminance SD is lower than the threshold illuminance SDth, the driving assist ECU 20 determines that current time is the time in the nighttime, and sets the control permission threshold temperature Tkyo to a second control permission threshold temperature Tkyo2, while setting the control prohibition threshold temperature Tkin to a second control prohibition threshold temperature Tkin2.

The second control permission threshold temperature Tkyo2 is set to a temperature lower than the first control permission threshold temperature Tkyo1 (Tkyo2<Tkyo1).

Furthermore, the second control prohibition threshold temperature Tkin2 is a temperature obtained by an experiment or the like as a temperature which can ensure more reliable prevention of heat noises in the camera image 11a. The second control prohibition threshold temperature Tkin2 is prestored in the ROM of the driving assist ECU 20. Therefore, the second control prohibition threshold temperature Tkin2 is set to a temperature lower than the first control prohibition threshold temperature Tkin1 (Tkin2<Tkin1). Furthermore, the second control prohibition threshold temperature Tkin2 is set to a temperature higher than the second control permission threshold temperature Tkyo2 (Tkyo2<Tkin2).

However, the second control permission threshold temperature Tkyo2 may be set to a temperature equal to the first control permission threshold temperature Tkyo1 (Tkyo2=Tkyo1), or may be set to a temperature higher than the first control permission threshold temperature Tkyo1 (Tkyo1<Tkyo2).

Figure 4B:
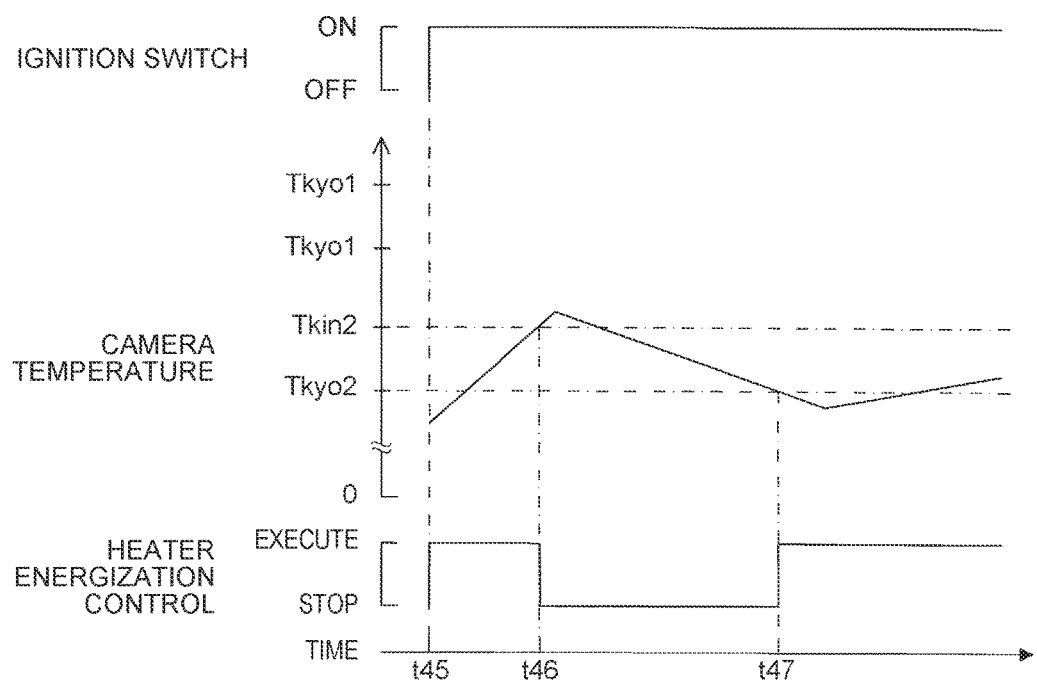
FIG. 4B is a time chart for describing another operating pattern of the control device for a vehicle heater according to the present embodiment.

Assume the case where, with the above setting, the camera temperature T is lower than the control permission threshold temperature Tkyo (=second control permission threshold temperature Tkyo2) at the moment when the ignition switch 61 is set to the ON position and the driving assist ECU 20 requests the heater ECU 30 to execute the heater energization control (time t45) as illustrated in FIG. 4B. In this case, the driving assist ECU 20 determines that the heater energization control permission condition is satisfied, and permits the heater ECU 30 to execute the heater energization control. As a result, since execution of the heater energization control is requested and the execution of the heater energization control is permitted, the heater ECU 30 starts the heater energization control.

On the contrary, assume the case, though not illustrated, where the camera temperature T is equal to or higher than the control permission threshold temperature Tkyo (=Tkyo2) at the moment when the ignition switch 61 is set to the ON position and the driving assist ECU 20 requests the heater ECU 30 to execute the heater energization control. In this case, the driving assist ECU 20 determines that the heater energization control permission condition is not satisfied, and does not permit the heater ECU 30 to execute the heater energization control. Therefore, although execution of the heater energization control is requested, the execution of the heater energization control is not permitted. Accordingly, the heater ECU 30 does not start the heater energization control, and maintains the state where the heater energization control is stopped.

Furthermore, as illustrated in FIG. 4B, when the heater energization control is started and then the camera temperature T rises to the control prohibition threshold temperature Tkin (=Tkin2) or higher (time t46), the driving assist ECU 20 determines that the heater energization control prohibition condition is satisfied, and prohibits the heater ECU 30 from executing the heater energization control. Accordingly, although execution of the heater energization control is requested, the execution of the heater energization control is prohibited, and therefore the heater ECU 30 stops the heater energization control.

In addition, when the heater energization control is stopped, and then the camera temperature T falls to the control permission threshold temperature Tkyo (=second control permission threshold temperature Tkyo2) or lower (time t47), the driving assist ECU 20 determines that the heater energization control permission condition is satisfied, and permits the heater ECU 30 to execute the heater energization control. As a result, since execution of the heater energization control is requested and the execution of the heater energization control is permitted, the heater ECU 30 resumes the heater energization control.

The outline of the heater energization control in the device of the embodiment is as described above. According to the above description, the temperature Tkin2 set as the control prohibition threshold temperature Tkin in the nighttime is lower than the temperature Tkin1 set as the control prohibition threshold temperature Tkin in the daytime. Therefore, the camera temperature T in the nighttime is maintained to be lower than the camera temperature T in the daytime. Accordingly, there is a high possibility that generation of the heat noises in the camera image photographed in the nighttime can be prevented, or there is a high possibility that the number of the heat noises generated in the camera image photographed in the nighttime can be decreased from the number of the heat noises in the daytime. Accordingly, there is a high possibility that the driving assist ECU 20 can determine whether or not the leading vehicle 105 and the oncoming vehicle 110 are present using the camera image photographed in the nighttime.

<Specific Operation of Device of Embodiment>

A description is now given of specific operation of the device of the embodiment. The CPU of the driving assist ECU 20 (which is simply referred to as "the driving assist CPU" below) executes a routine in the flowchart illustrated in FIG. 5 whenever predetermined time elapses. Therefore, at specified timing, the driving assist CPU starts the processing from step 500, and advances the processing to step 510 to determine whether or not the acquired illuminance SD is equal to or higher than the threshold illuminance SDth based on the signal from the illuminance sensor 66.

When the illuminance SD is equal to or higher than the threshold illuminance SDth (i.e., when current time is the time in the daytime), the driving assist CPU determines "Yes" in step 510. After performing processing of step 520 described below, the driving assist CPU advances the processing to step 595 to temporarily end the routine.

Step 520: the driving assist CPU sets the control permission threshold temperature Tkyo to the first control permission threshold temperature Tkyo1 and stores the control permission threshold temperature Tkyo in the RAM, while setting the control prohibition threshold temperature Tkin to the first control prohibition threshold temperature Tkin1, and storing the control prohibition threshold temperature Tkin in the RAM.

In the case where the illuminance SD is lower than the threshold illuminance SDth (i.e., in the case where current time is the time in the nighttime) at the moment when the driving assist CPU executes processing of step 510, the driving assist CPU determines "No" in step 510. After performing processing of step 530 described below, the driving assist CPU advances the processing to step 595 to temporarily end the routine.

Step 530: the driving assist CPU sets the control permission threshold temperature Tkyo to the second control permission threshold temperature Tkyo2 and stores the control permission threshold temperature Tkyo in the RAM, while setting the control prohibition threshold temperature Tkin to the second control prohibition threshold temperature Tkin2, and storing the control prohibition threshold temperature Tkin in the RAM.

Figure 6:
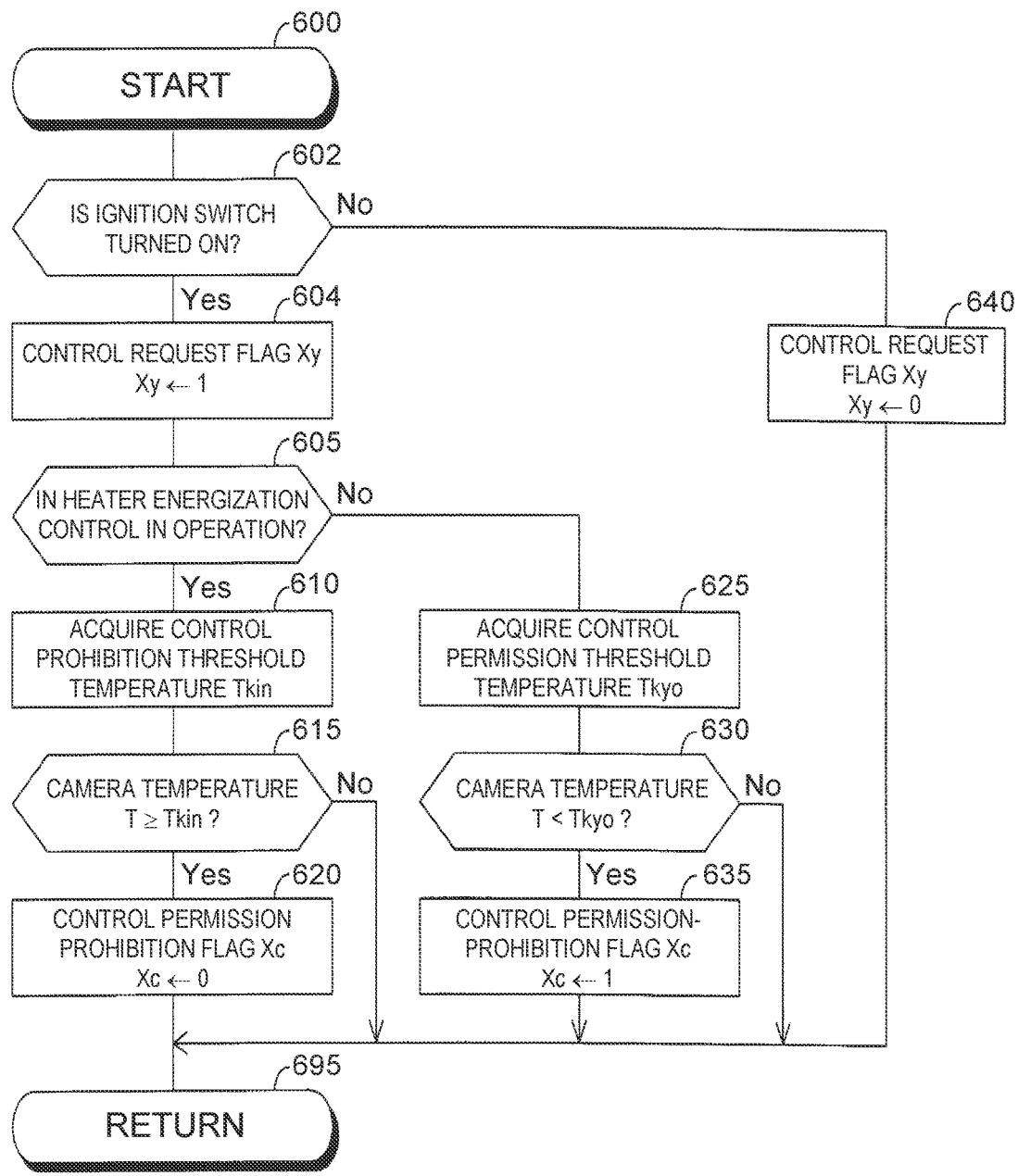
FIG. 6 is a flowchart illustrating a routine executed by the CPU of the driving assist ECU illustrated in FIG. 1.

The driving assist CPU further executes a routine in the flowchart illustrated in FIG. 6 whenever predetermined time elapses. Therefore, at specified timing, the driving assist CPU starts the processing from step 600 of FIG. 6, and advances the processing to step 602 to determine whether or not the ignition switch 61 is set to the ON position.

When the ignition switch 61 is set to the ON position, the driving assist CPU determines "Yes" in step 602. After performing processing of step 604 described below, the driving assist CPU advances the processing to step 605.

Step 604: the driving assist CPU sets the value of a control request flag Xy to "1". When the value of the control request flag Xy is "1", it indicates that execution of the heater energization control by the heater ECU 30 is requested. When the value is "0", it indicates that execution of the heater energization control by the heater ECU 30 is not requested.

When the processing proceeds to step 605, the driving assist CPU determines whether or not the heater energization control is in operation. When the heater energization control is in operation, the driving assist CPU determines "Yes" in step 605, and performs processing of step 610 described below. Then the driving assist CPU advances the processing to step 615.

Step 610: the driving assist CPU acquires the latest control prohibition threshold temperature Tkin stored in the RAM.

The driving assist CPU advances the processing to step 615 to determine whether or not the camera temperature T is equal to or higher than the control prohibition threshold temperature Tkin. When the camera temperature T is equal to or higher than the control prohibition threshold temperature Tkin, the driving assist CPU determines "Yes" in step 615, and performs processing of step 620 described below. The driving assist CPU then advances the processing to step 695 to temporarily end the present routine.

Step 620: the driving assist CPU sets the value of a control permission-prohibition flag Xc to "0". When the value of the control permission-prohibition flag Xc is "0", it indicates that execution of the heater energization control is prohibited. When the value is "1", it indicates that execution of the heater energization control is permitted.

When the camera temperature T is lower than the control prohibition threshold temperature Tkin at the moment when the driving assist CPU executes the processing of step 615, the driving assist CPU determines "No" in step 615, and directly advances the processing to step 695 to temporarily end the present routine. In this case, execution of the heater energization control is continued.

When the heater energization control is not in operation at the moment when the driving assist CPU executes the processing of step 605, the driving assist CPU determines "No" in step 605, and performs processing of step 625 described below. The driving assist CPU then advances the processing to step 630.

Step 625: the driving assist CPU acquires the latest control permission threshold temperature Tkyo stored in the RAM.

The driving assist CPU advances the processing to step 630 to determine whether or not the camera temperature T is equal to or lower than the control permission threshold temperature Tkyo. When the camera temperature T is equal to or lower than the control permission threshold temperature Tkyo, the driving assist CPU determines "Yes" in step 630, and performs processing of step 635 described below. The driving assist CPU then advances the processing to step 695 to temporarily end the present routine.

Step 635: the driving assist CPU sets the value of the control permission-prohibition flag Xc to "1".

When the camera temperature T is equal to or larger than the control permission threshold temperature Tkyo at the moment when the driving assist CPU executes the processing of step 630, the driving assist CPU determines "No" in step 630, and directly advances the processing to step 695, where the present routine is temporarily ended. In this case, the heater energization control is continued to be in the stopped state.

When the ignition switch 61 is set to the OFF position, the driving assist CPU determines "No" in step 602. After performing processing of step 640 described below, the driving assist CPU advances the processing to step 695, where the present routine is temporarily ended.

Step 640: the driving assist CPU sets the value of a control request flag Xy to "0".

The CPU of the heater ECU 30 of the device of the embodiment (which is referred to as "the heater CPU" below) executes a routine in the flowchart illustrated in FIG. 7 whenever predetermined time lapses. Therefore, at specified timing, the heater CPU starts processing from step 700 of FIG. 7, and advances the processing to step 705 to determine whether or not the value of a control request flag Xy is "1".

When the value of the control request flag Xy is "1", the heater CPU determines "Yes" in step 705, and advances the processing to step 710 to determine whether or not the value of the control permission-prohibition flag Xc is "1". When the value of the control permission-prohibition flag Xc is "1", the heater CPU determines "Yes" in step 710, and advances the processing to step 715 to determine whether or not energization continuation time TKon is larger than zero.

When the energization continuation time TKon is larger than zero, the heater CPU determines "Yes" in step 715, and advances the processing to step 720 to determine whether or not the energization continuation time TKon is equal to or larger than specified continuation time Ton. When the energization continuation time TKon is equal to or larger than the specified continuation time Ton, the heater CPU determines "Yes" in step 720, and performs processing of step 725 described below. The heater CPU then advances the processing to step 795 to temporarily end the present routine.

Step 725: the heater CPU stops energization of the heater 31.

When the energization continuation time TKon is smaller than the specified continuation time Ton at the moment when the heater CPU executes the processing of step 720, the CPU determines "No" in step 720, and directly advances the processing to step 795, where the present routine is temporarily ended.

When the energization continuation time TKon is zero at the moment when the heater CPU executes the processing of step 715, the CPU determines "No" in step 715, and advances the processing to step 730 to determine whether or not energization stop time TKoff is larger than zero. When the energization stop time TKoff is larger than zero, the CPU determines "Yes" in step 715, and advances the processing to step 735 to determine whether or not the energization stop time TKoff is equal to or larger than specified energization stop time Toff.

When the energization stop time TKoff is equal to or larger than the specified energization stop time Toff, the heater CPU determines "Yes" in step 735, and performs processing of step 740 described below. The heater CPU then advances the processing to step 795, where the present routine is temporarily ended.

Step 740: the heater CPU starts energization of the heater 31.

When the energization stop time TKoff is zero at the moment when the heater CPU executes the processing of step 730, the CPU determines "No" in step 730, and executes processing of step 745 described below. The heater CPU then advances the processing to step 795, where the present routine is temporarily ended.

Step 745: the heater CPU starts energization of the heater 31. Therefore, the heater CPU starts energization of the heater 31.

When the value of the control request flag Xy is "0" at the moment when the heater CPU executes the processing of step 705, and when the control permission-prohibition flag Xc is "0" at the moment when the heater CPU executes the processing of step 710, the heater CPU determines "No" in each of steps 705 and 710, and performs processing of step 750 described below. The heater CPU then advances the processing to step 795, where the present routine is temporarily ended.

Step 750: the heater CPU stops energization of the heater 31.

Figure 5:
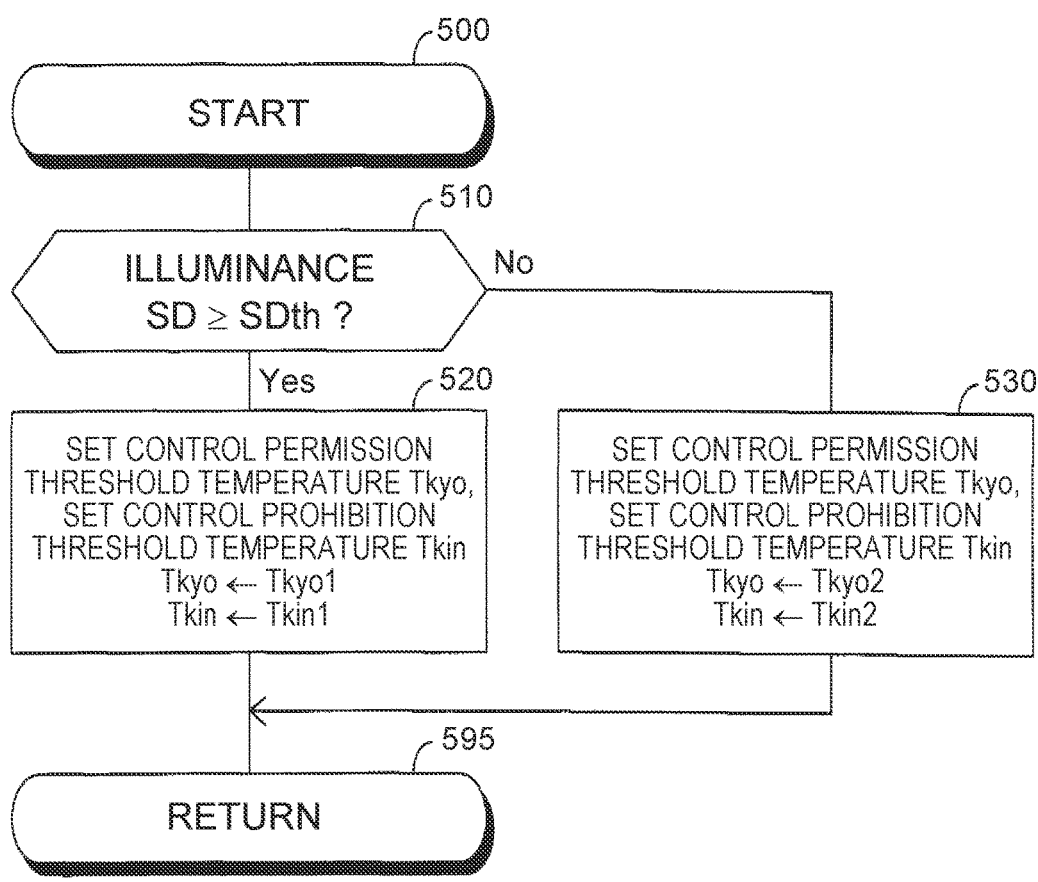
FIG. 5 is a flowchart illustrating a routine executed by the CPU of a driving assist ECU illustrated in FIG. 1.
Figure 7:
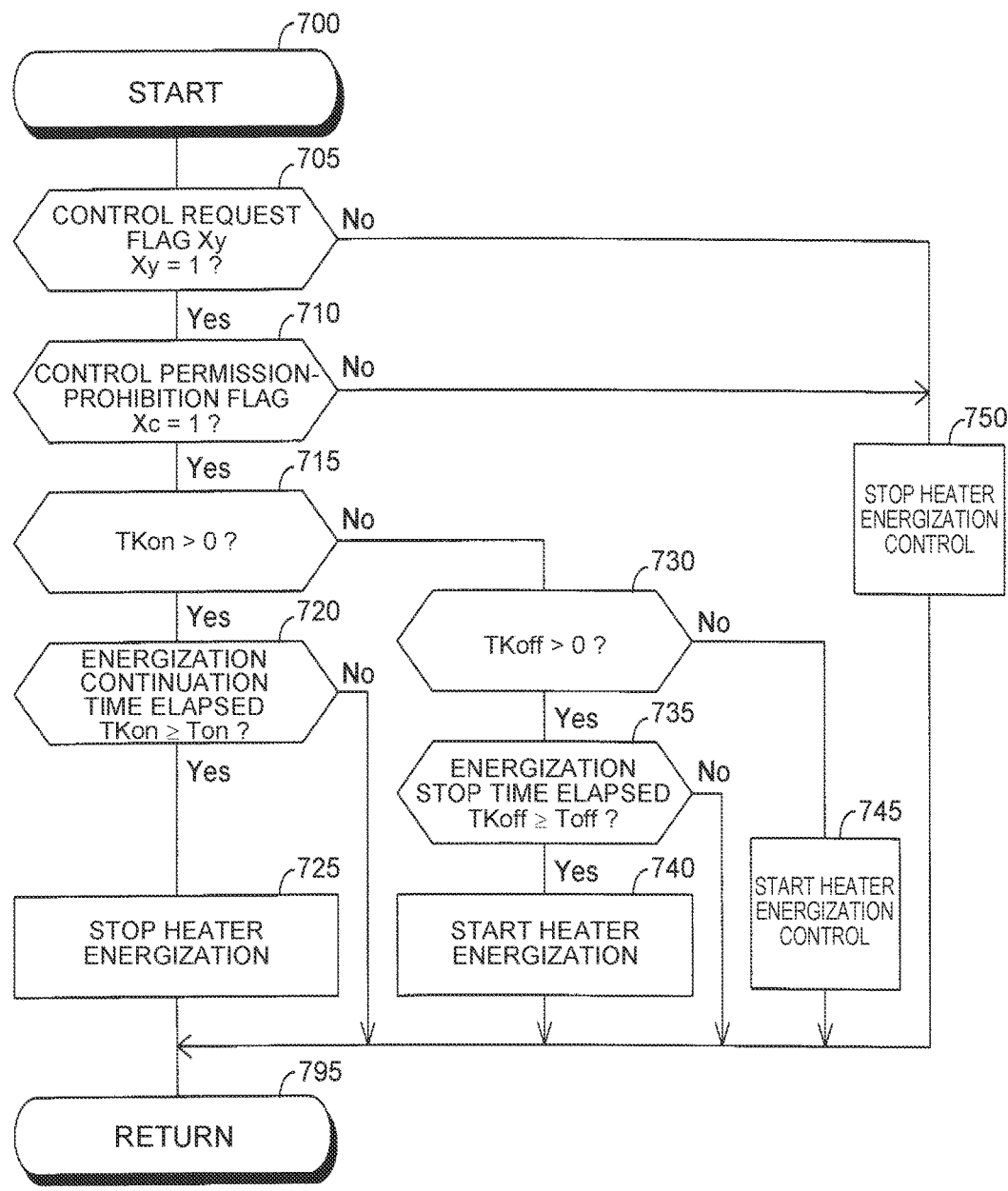
FIG. 7 is a flowchart illustrating a routine executed by the CPU of a heater ECU illustrated in FIG. 1.

According to the routines of FIG. 5 through FIG. 7, the control prohibition threshold temperature Tkin (=Tkin2) set in the nighttime is lower than the control prohibition threshold temperature Tkin (=Tkin1) set in the daytime (see steps 520 and 530 of FIG. 5). Accordingly, there is a high possibility that generation of the heat noises in the camera image 11a photographed in the nighttime can be prevented, or there is a high possibility that the number of the heat noises generated in the camera image photographed in the nighttime can be decreased from the number of the heat noises in the daytime. Accordingly, there is a high possibility that the driving assist ECU 20 can determine whether or not the leading vehicle 105 and the oncoming vehicle 110 are present in the nighttime.

The driving assist CPU executes a routine in the flowchart illustrated in FIG. 8 whenever predetermined time elapses. Therefore, at specified timing, the driving assist CPU starts processing from step 800 of FIG. 8, and advances the processing to step 805 to determine whether or not the head lamp 64 is lit.

When the head lamp 64 is lit, the driving assist CPU determines "Yes" in step 805, and advances the processing to step 810 to determine whether or not any one of the leading vehicle 105 and the oncoming vehicle 110 is present. When any one of the leading vehicle 105 and the oncoming vehicle 110 is present (when the low beam condition is satisfied), the driving assist CPU determines "Yes" in step 810, and performs processing of step 820 described below. The driving assist CPU then advances the processing to step 895, where the present routine is temporarily ended.

Step S820: when the lighting state of the head lamp 64 is in the high beam lighting state, the driving assist CPU shifts the lighting state of the head lamp 64 from the high beam lighting state to the low beam lighting state.

When neither the leading vehicle 105 nor the oncoming vehicle 110 is present (when the high beam condition is satisfied) at the moment when the driving assist CPU executes the processing of step 810, the driving assist CPU determines "No" in step 810, and performs processing of step 825 described below. The driving assist CPU then advances the processing to step 895, where the present routine is temporarily ended.

Step S825: when the lighting state of the head lamp 64 is in the low beam lighting state, the driving assist CPU shifts the lighting state of the head lamp 64 from the low beam lighting state to the high beam lighting state.

When the head lamp 64 is not lit at the moment when the driving assist CPU executes the processing of step 805, the driving assist CPU determines "No" in step 805, and directly advances the processing to step 895, where the present routine is temporarily ended.

The present disclosure is not limited to the embodiment disclosed. Various modifications can be adopted within the range of the present disclosure.

For example, in the window glass heating device according to the embodiment, the control permission threshold temperature Tkyo is set to the temperature lower than the control prohibition threshold temperature Tkin. However, in a modification, the control permission threshold temperature Tkyo may be set to the temperature identical to the control prohibition threshold temperature Tkin. In this case, when the illuminance SD is equal to or more than the threshold illuminance SDth, the driving assist ECU 20 sets a threshold temperature (which is referred to as "control permission-prohibition threshold temperature" below) Tkk, which is used in order to determine whether to permit or prohibit the heater energization control, to a first control permission-prohibition threshold temperature Tkk1.

Figure 9A:
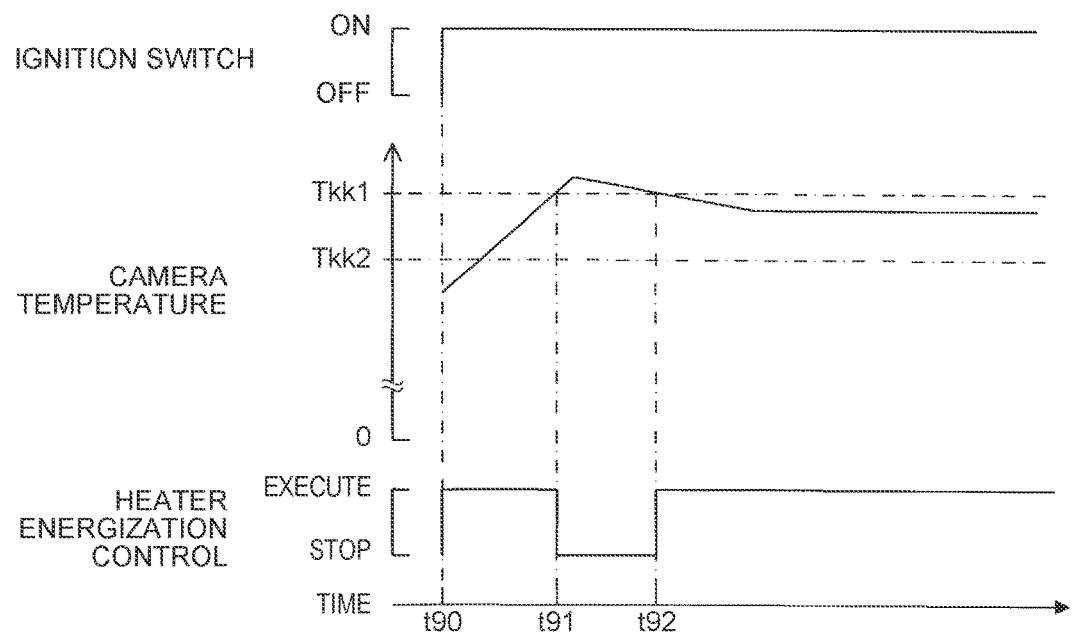
FIG. 9A is a time chart for describing one operating pattern of the control device for a vehicle heater according to a modification of the present embodiment.

In this case, as illustrated in FIG. 9A, when the ignition switch 61 is set to the ON position (time t90), the driving assist ECU 20 requests the heater ECU 30 to execute the heater energization control. At this time, when the camera temperature T is lower than the control permission-prohibit threshold temperature Tkk (=first control permission-prohibit threshold temperature Tkk1), the driving assist ECU 20 permits the heater ECU 30 to execute the heater energization control. As a result, since execution of the heater energization control is requested and the execution of the heater energization control is permitted, the heater ECU 30 starts the heater energization control.

On the contrary, assume the case, though not illustrated, where the camera temperature T is equal to or higher than the control permission-prohibition threshold temperature Tkk (=Tkk1) at the moment when the ignition switch 61 is set to the ON position and the driving assist ECU 20 requests the heater ECU 30 to execute the heater energization control. In this case, the driving assist ECU 20 does not permit execution of the heater energization control by the heater ECU 30. Therefore, although execution of the heater energization control is requested, the execution of the heater energization control is not permitted. Accordingly, the heater ECU 30 does not start the heater energization control, and maintains the state where the heater energization control is stopped.

Furthermore, as illustrated in FIG. 9A, when the heater energization control is started and then the camera temperature T rises to the control permission-prohibition threshold temperature Tkk (=Tkk1) or higher (time t91), the driving assist ECU 20 prohibits execution of the heater energization control by the heater ECU 30. Accordingly, although execution of the heater energization control is requested, the execution of the heater energization control is prohibited, and therefore the heater ECU 30 stops the heater energization control.

In addition, when the heater energization control is stopped and then the camera temperature T falls to the control permission-prohibition threshold temperature Tkk (=Tkk1) or lower (time t92), the driving assist ECU 20 permits execution of the heater energization control by the heater ECU 30. As a result, since execution of the heater energization control is requested and the execution of the heater energization control is permitted, the heater ECU 30 resumes the heater energization control.

On the contrary, when the illuminance SD is lower than the threshold illuminance SDth, the driving assist ECU 20 sets the control permission-prohibition threshold temperature Tkk to a second control permission-prohibition threshold temperature Tkk2. The second control permission-prohibition threshold temperature Tkk2 is set to a temperature lower than the first control permission-prohibition threshold temperature Tkk1 (Tkk2<Tkk1).

Figure 9B:
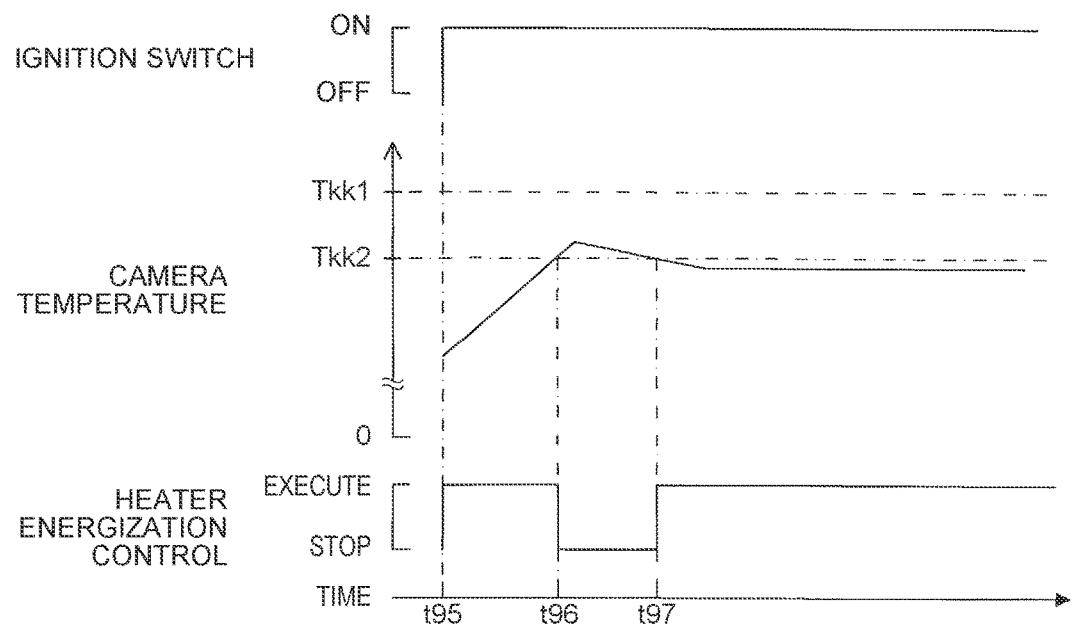
FIG. 9B is a time chart for describing another operating pattern of the control device for a vehicle heater according to the modification.

In this case, as illustrated in FIG. 9B, when the ignition switch 61 is set to the ON position (time t95), the driving assist ECU 20 requests the heater ECU 30 to execute the heater energization control. At this time, when the camera temperature T is lower than the control permission-prohibit threshold temperature Tkk (=second control permission-prohibit threshold temperature Tkk2), the driving assist ECU 20 permits the heater ECU 30 to execute the heater energization control. As a result, since execution of the heater energization control is requested, and the execution of the heater energization control is permitted, the heater ECU 30 starts the heater energization control.

On the contrary, assume the case, though not illustrated, where the camera temperature T is equal to or more than the control permission-prohibition threshold temperature Tkk (=Tkk2) at the moment when the ignition switch 61 is set to the ON position and the driving assist ECU 20 requests the heater ECU 30 to execute the heater energization control. In this case, the driving assist ECU 20 does not permit execution of the heater energization control by the heater ECU 30. Therefore, although execution of the heater energization control is requested, the execution of the heater energization control is not permitted. Accordingly, the heater ECU 30 does not start the heater energization control, but maintains the state where the heater energization control is stopped.

Furthermore, as illustrated in FIG. 9B, when the heater energization control is started and then the camera temperature T rises to the control permission-prohibition threshold temperature Tkk (=Tkk2) or more (time t96), the driving assist ECU 20 prohibits execution of the heater energization control by the heater ECU 30. Accordingly, although execution of the heater energization control is requested, the execution of the heater energization control is prohibited, and therefore the heater ECU 30 stops the heater energization control.

In addition, when the heater energization control is stopped and then the camera temperature T falls to the control permission-prohibition threshold temperature Tkk (=Tkk2) or lower (time t97), the driving assist ECU 20 permits execution of the heater energization control by the heater ECU 30. As a result, since execution of the heater energization control is requested and the execution of the heater energization control is permitted, the heater ECU 30 resumes the heater energization control.

According to the above description, the temperature Tkk2 set as the control permission-prohibition threshold temperature Tkk in the nighttime is lower than the temperature Tkk1 set as the control permission-prohibition threshold temperature Tkk1 in the daytime. Therefore, the camera temperature T in the nighttime is maintained to be lower than the camera temperature in the daytime. Accordingly, there is a high possibility that generation of the heat noises in the camera image photographed in the nighttime can be prevented, or there is a high possibility that the number of the heat noises generated in the camera image photographed in the nighttime can be decreased from the number of the heat noises in the daytime. Accordingly, there is a high possibility that the driving assist ECU 20 can determine whether or not the leading vehicle 105 and the oncoming vehicle 110 are present using the camera image photographed in the nighttime.

When the camera 11 is disposed inside the vehicle 100 so as to photograph the outside of the vehicle 100 from the inside of the vehicle 100 through a window glass (rear glass) behind the vehicle 100, the heater 31 may be a heater heating a portion of the rear glass in front of the camera 11.

Furthermore, when the camera 11 is disposed inside the vehicle 100 so as to photograph the outside of the vehicle 100 from the inside of the vehicle 100 through a window glass (side glass) on a lateral side of the vehicle 100, the heater 31 may be a heater heating a portion of the side glass in front of the camera 11.

The vehicle 100 according to the embodiment may include a switch operated by the user of the vehicle 100 in order to request the heater ECU 30 to execute the heater energization control. In this case, the driving assist ECU 20 may be configured to request the heater ECU 30 to execute the heater energization control when the switch is set to the ON position by the user of the vehicle 100. The driving assist ECU 20 may also be configured to stop the request for executing the heater energization control to the heater ECU 30 when the switch is set to the OFF position by the user of the vehicle 100.

The driving assist ECU 20 according to the embodiment may be configured to acquire the camera temperature T from an electric resistance value of an internal circuit of the camera 11. In this case, the driving assist ECU 20 according to the embodiment may be configured to acquire the electric resistance value of the internal circuit of the camera 11 as a value correlated with the camera temperature T (camera temperature correlation value), and to determine whether or not to prohibit execution of the heater energization control by the heater ECU 30 based on the camera temperature correlation value.

The driving assist ECU 20 according to the embodiment may be configured to acquire the illuminance SD from the illuminance of a camera image. In this case, the driving assist ECU 20 according to the embodiment may be configured to acquire a value correlated with the illuminance SD (illuminance correlation value) from the illuminance of the camera image, to determine whether to set a first control permission threshold temperature Tkyo1 or a second control permission threshold temperature Tkyo2 as the control permission threshold temperature Tkyo based on the illuminance correlation value, and to determine whether to set a first control prohibition threshold temperature Tkin1 or a second control prohibition threshold temperature Tkin2 as the control prohibition threshold temperature Tkin based on the illuminance correlation value.

Furthermore, the driving assist ECU 20 according to the embodiment may be configured to use camera images to perform driving assist control for the driver of the vehicle 100. Examples of the driving assist control include inter-vehicle distance control that maintains a specified distance (inter-vehicle distance) between the vehicle 100 and a vehicle (leading vehicle) traveling ahead of the vehicle 100, lane maintaining control that recognizes white lines a traveling lane of the vehicle 100 and changes the steering angle of an unillustrated steering wheel of the vehicle 100 in order to keep the vehicle 100 within the lane, and collision avoidance control that recognizes an obstacle present ahead of the vehicle 100, and operates an unillustrated braking device in order to avoid collision of the vehicle 100 with the obstacle.

What is claimed is:

1. A control device for a vehicle heater, comprising:
   a camera configured to photograph an outside of a vehicle from an inside of the vehicle through a window glass of the vehicle;
   a heater configured to generate heat upon energization and to heat a portion of the window glass located in front of the camera using the heat;
   a temperature sensor configured to acquire a camera temperature correlation value that is a value correlated with temperature of the camera;
   an illuminance acquisition unit configured to acquire an illuminance correlation value that is a value correlated with illuminance outside the vehicle; and
   a control unit configured to
      execute heater energization control that controls energization of the heater,
      determine that a control prohibition condition to prohibit execution of the heater energization control is satisfied when the camera temperature correlation value is equal to or larger than a prohibition threshold temperature correlation value,
      determine that a control permission condition to permit execution of the heater energization control is satisfied when the camera temperature correlation value is smaller than a permission threshold temperature correlation value that is equal to or smaller than the prohibition threshold temperature correlation value,
      execute the heater energization control when execution of the heater energization control is requested and the control permission condition is satisfied,
      prevent execution of the heater energization control when the control prohibition condition is satisfied, and
      when the illuminance correlation value is smaller than a threshold illuminance correlation value, set the prohibition threshold temperature correlation value to be smaller than when the illuminance correlation value is equal to or larger than the threshold illuminance correlation value.

2. The control device for the vehicle heater according to claim 1, wherein
   the control unit is configured to set the permission threshold temperature correlation value to be smaller than the prohibition threshold temperature correlation value.

3. The control device for the vehicle heater according to claim 1, wherein
   when the illuminance correlation value is smaller than the threshold illuminance correlation value, the control unit sets the permission threshold temperature correlation value to be smaller than when the illuminance correlation value is equal to or larger than the threshold illuminance correlation value.

4. The control device for the vehicle heater according to claim 1, wherein the illuminance acquisition unit is an electric control unit that includes a central processing unit and memory, wherein the central processing unit is configured to execute programs stored in the memory.

5. The control device for the vehicle heater according to claim 1, wherein the control unit is an electric control unit that includes a central processing unit and memory, wherein the central processing unit is configured to execute programs stored in the memory.

6. The control device for the vehicle heater according to claim 5, wherein
   the electric control unit is configured to set the permission threshold temperature correlation value to be smaller than the prohibition threshold temperature correlation value.

7. The control device for the vehicle heater according to claim 5, wherein
   when the illuminance correlation value is smaller than the threshold illuminance correlation value, the electric control unit sets the permission threshold temperature correlation value to be smaller than when the illuminance correlation value is equal to or larger than the threshold illuminance correlation value.

8. The control device for the vehicle heater according to claim 1, wherein the illuminance acquisition unit and the control unit are an electric control unit that includes a central processing unit and memory, wherein the central processing unit is configured to execute programs stored in the memory.

9. The control device for the vehicle heater according to claim 8, wherein
   the electric control unit is configured to set the permission threshold temperature correlation value to be smaller than the prohibition threshold temperature correlation value.

10. The control device for the vehicle heater according to claim 8, wherein
    when the illuminance correlation value is smaller than the threshold illuminance correlation value, the electric control unit sets the permission threshold temperature correlation value to be smaller than when the illuminance correlation value is equal to or larger than the threshold illuminance correlation value.

* * * * *